(12) United States Patent
Mallya et al.

(10) Patent No.: US 9,245,336 B2
(45) Date of Patent: Jan. 26, 2016

(54) CONTOUR GUIDED DEFORMABLE IMAGE REGISTRATION

(75) Inventors: Yogish Mallya, Bangalore (IN); Timothy Poston, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 151 days.

(21) Appl. No.: 13/993,142

(22) PCT Filed: Dec. 13, 2011

(86) PCT No.: PCT/IB2011/055638
§ 371 (c)(1),
(2), (4) Date: Jun. 11, 2013

(87) PCT Pub. No.: WO2012/080949
PCT Pub. Date: Jun. 21, 2012

(65) Prior Publication Data
US 2013/0259335 A1   Oct. 3, 2013

Related U.S. Application Data

(60) Provisional application No. 61/423,150, filed on Dec. 15, 2010.

(51) Int. Cl.
*G06T 7/00* (2006.01)
*G06T 19/00* (2011.01)

(52) U.S. Cl.
CPC ............. *G06T 7/0012* (2013.01); *G06T 7/0024* (2013.01); *G06T 2207/10072* (2013.01)

(58) Field of Classification Search
CPC ... G06T 7/0089; G06T 7/0032; G06T 7/0083; G06T 7/0097; G06T 7/0038; G06T 7/602; G06T 2207/10081; G06K 9/6206; G06K 9/48; G06K 9/3216; G06K 2209/05

USPC .......................................................... 382/128
See application file for complete search history.

(56) References Cited

U.S. PATENT DOCUMENTS 5,633,951 A * 5/1997 Moshfeghi .................... 382/154
6,542,858 B1  4/2003 Grass et al.
(Continued)

FOREIGN PATENT DOCUMENTS

WO     2006118548 A1    11/2006

OTHER PUBLICATIONS

Thirion, Image matching as a diffusion process: an analogy with Maxwell's demons, Medical, Image Analysis, 1998, pp. 243-260, vol. 2, No. 3.

(Continued)

*Primary Examiner* — Vu Le
*Assistant Examiner* — Kenny Cese (57) ABSTRACT

A method includes obtaining first volumetric image data, which is acquired at a first time, including a region of interest with a structural feature located at a first position. The method further includes obtaining second volumetric image data, which is acquired at a second different time, including the region of interest with the structural feature located at a second different position. The method further includes determining a registration transformation that registers the first and second volumetric image data such that the at least one structural feature in the first volumetric image data aligns with the at least one structural feature in the second volumetric image data. The registration transformation is based at least on a contour guided deformation registration. The method further includes generating a signal indicative of the registration transformation.

25 Claims, 4 Drawing Sheets

(56) References Cited

U.S. PATENT DOCUMENTS

| | | |
|---|---|---|
| 6,611,615 B1 | 8/2003 | Christensen |
| 6,647,358 B2 | 11/2003 | Grass et al. |
| 6,996,473 B2 | 2/2006 | Grass et al. |
| 7,167,760 B2 | 1/2007 | Dawant et al. |
| 7,250,496 B2 | 7/2007 | Bentwich |
| 7,352,370 B2 | 4/2008 | Wang et al. |
| 7,643,662 B2 | 1/2010 | Gering |
| 7,646,936 B2 | 1/2010 | Nord et al. |
| 7,657,073 B2 | 2/2010 | Sun et al. |
| 7,668,358 B2 | 2/2010 | Snoeren et al. |
| 7,693,349 B2 | 4/2010 | Gering |
| 7,778,488 B2 | 8/2010 | Nord et al. |
| 7,782,998 B2 | 8/2010 | Langan et al. |
| 2005/0004617 A1 | 1/2005 | Dawant et al. |
| 2005/0070781 A1 | 3/2005 | Dawant et al. |
| 2006/0072808 A1* | 4/2006 | Grimm ............... G06T 7/0028 382/151 |
| 2006/0133564 A1 | 6/2006 | Langan et al. |
| 2007/0016079 A1 | 1/2007 | Freeman et al. |
| 2007/0053491 A1* | 3/2007 | Schildkraut .......... A61N 5/1049 378/65 |
| 2007/0116381 A1 | 5/2007 | Khamene |
| 2007/0255965 A1 | 11/2007 | McGucken |
| 2008/0044104 A1 | 2/2008 | Gering |
| 2008/0049991 A1 | 2/2008 | Gering |
| 2008/0080788 A1 | 4/2008 | Nord et al. |
| 2008/0168403 A1 | 7/2008 | Westerman et al. |
| 2008/0212852 A1 | 9/2008 | Sun et al. |
| 2008/0232714 A1 | 9/2008 | Nord et al. |
| 2008/0317204 A1 | 12/2008 | Sumanaweera et al. |
| 2009/0110294 A1 | 4/2009 | Frielinghaus et al. |
| 2009/0161931 A1 | 6/2009 | Tao et al. |
| 2009/0190809 A1* | 7/2009 | Han ..................... G06K 9/6207 382/128 |
| 2009/0228299 A1 | 9/2009 | Kangarloo et al. |
| 2009/0257557 A1 | 10/2009 | Sumanaweera et al. |
| 2010/0021082 A1 | 1/2010 | Declerck |
| 2011/0176746 A1* | 7/2011 | Bucki et al. ................. 382/293 |

OTHER PUBLICATIONS

Wang et al., Validation of an accelerated 'demons' algorithm for deformable image registration in radiation therapy, Physics in Medicine and Biology, Phys. Med. Biol., 2005, pp. 2887-2905, vol. 50, Institute of Physics Publishing.

Staring, et al., Nonrigid Registration Using a Rigidity Constraint, Medical Imaging 2006: Image Processing, Proc. of SPIE, 2006, pp. 614413-1 through 614413-10, vol. 6144.

Miller, et al., Deformable Registration with Spatially Varying Degrees of Freedom Constraints, Biomedical Imaging: From Nano to Macro, 2008. ISBI 2008. 5th IEEE International Symposium on, May 14-17, 2008, pp. 1163-1166.

Muyan-Ozcelik, Fast Deformable Registration on the GPU: A CUDE Implementation of Demons, International Conference on Computational Sciences and its applications ICCSA 2008, 2008, pp. 223-233.

Yang et al., Unbiased Histogram Matching Quality Measurement for Optimal Radiometric Normalization, ASPRS 2008 Annual Conference, Apr. 28-May 2, 2007, 12 sheets.

Nithiananthan, et al., Demons deformable registration for CBCT-guided procedures in the head and neck: Convergence and accuracy, Med. Phys., Oct. 2009, pp. 4755-4764, vol. 36, No. 10.

Gu, et al., Implementation and evaluation of various demons deformable image registration algorithms on a GPU, Physics in Medicine and Biology, 2010, pp. 207-219, vol. 55.

Rekimoto, J.; SmartSkin: An Infrastructure for Freehand Manipulation on Interactive Surfaces; 2001; ACM; 1-58113-453-3/02/0004; 8 pages.

Hartkens, T., et al.; Using Points and Surfaces to Improve Voxel-Based Non-rigid Registration; 2002; MICCAI; vol. 2489:565-572.

Joshi, A., et al.; Brain Image Registration Using Cortically Constrained Harmonic Mappings; 2007; Information Processing in Medical Imaging; pp. 359-371.

\* cited by examiner

CONTOUR GUIDED DEFORMABLE IMAGE REGISTRATION

CROSS REFERENCE TO RELATED APPLICATIONS

This application is a national filing of PCT application Serial No. PCT/IB2011/055638, filed Dec. 13, 2011, published as WO 2012/080949 A1 on Jun. 21, 2012, which claims the benefit of U.S. provisional application Ser. No. 61/423,150 filed Dec. 15, 2010, which is incorporated herein by reference.

FIELD OF THE INVENTION

The following generally relates to image processing and more particular to contour guided deformable image registration, and is described with particular application to computed tomography (CT) and radiation therapy treatment planning; however, the following is also amenable to other imaging modalities, such a magnetic resonance imaging (MRI), positron emission tomography (PET), etc., and/or applications, and to other treatment modalities such as focussed ultrasound, interferential therapy, transcutaneous electrical nerve stimulation, pulsed shortwave therapy or laser therapy.

BACKGROUND OF THE INVENTION

Radiation treatment planning is the process creating a radiotherapy treatment plan for treating a tumor(s) via ionizing radiation. For treatment planning, the subject is scanned and the resulting volumetric image data is used as initial reference or planning image data to create a treatment plan for tumors or target volumes, segmented or contoured into regions of interest (ROI) in the image data. With radiotherapy, the prescribed radiation dose is delivered in a fractionated manner, with the radiation dose being divided and given over a number of treatments, which may span several weeks. Unfortunately, daily physiological changes (e.g., organ filling, weight loss, etc) can cause the tumor volume and surrounding anatomical structures to move and change in shape during the course of the therapy such that continuing to follow the initial plan may result in an actual received dose distribution the differs from the planned dose distribution. Similar modifications are needed in any plan for directing energy at particular tissue sites for which the map may change in the course of treatment, such as interferential therapy, transcutaneous electrical nerve stimulation, pulsed shortwave therapy, or laser therapy.

As a result, the initial plan should be adapted to match the new location and shape of the target volume and surrounding anatomical structures based on subsequently acquire image data such as image data acquired during a treatment session (in-treatment). Unfortunately, the workload involved in the such adaptive re-planning can be complex and time consuming as this involves delineation or segmentation of tissue of interest and anatomical structures from latest image data for the patient. In an alternative approach, a deformable registration is used to estimate a voxel-to-voxel mapping or transformation between initial image data and latest image data. Generally, such image registration is the process of aligning features in different images by applying a transformation to one of the images so that it matches the other. The transformation is used to propagate the contours in the initial image data to contours in the latest image data.

One such registration includes the Demons deformable image registration, which is described in Thirion, J. P., "Image matching as a diffusion process: an Analogy with Maxwell's demons," Medical Image Analysis, 1988, volume 2, number 3, pp. 243-260. Generally, Demons deformable image registration takes two images as input and produces a displacement or deformation vector field (DVF) that indicates the transformation that should be applied to voxels of one of the images so that it can be aligned with the other image. The Demons deformable image registration is an intensity (i.e., gray level) based registration in which the DVF is calculated, based on optical flow and via an iterative process, from local image information only, using a matching process that climbs the gradient of image intensity either upward or downward, in the direction of maximum steepness, in a manner that matches the gray levels as quick as possible. Unfortunately, with only the image gradient to guide the deformation process, as in the Demons deformable image registration, sideways movement of voxels is uncontrolled. The direction of maximum steepness may not be the direction in which tissue actually moved, and (since it is computed by the noisy process of estimating a gradient, composed numerically approximated derivatives) may vary unsteadily. This can lead to lack of smoothness and hence to geometric discontinuity in the deformed image and jaggedness in the propagated contours.

SUMMARY OF THE INVENTION

Aspects of the present application address the above-referenced matters and others.

According to one aspect, a method includes obtaining first volumetric image data, which is acquired at a first time, including a region of interest of a subject, wherein at least one structural feature in the region of interest is located at a first position in the first volumetric image data. The method further includes obtaining second volumetric image data, which is acquired at a second time, including the region of interest of the subject, wherein the at least one structural feature in the region of interest is located at a second position in the second volumetric image data. The second time is subsequent to the first time, and the first and second positions are different positions. The method further includes determining a registration transformation that registers the first and second volumetric image data such that the at least one structural feature in the first volumetric image data aligns with the at least one structural feature in the second volumetric image data. The registration transformation is based at least on a contour guided deformation registration. The method further includes generating a signal indicative of the registration transformation.

According to another aspect, a system includes a processor that determine a registration transformation that registers two images, wherein the registration transformation is determined based at least on voxel intensity values of the two images, voxel intensity gradient values for one of the two images, and guide vector values that indicates a direction of the registration.

According to another aspect, a method includes determining a deformation field vector which registers two images based on a contour guided deformable image registration.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
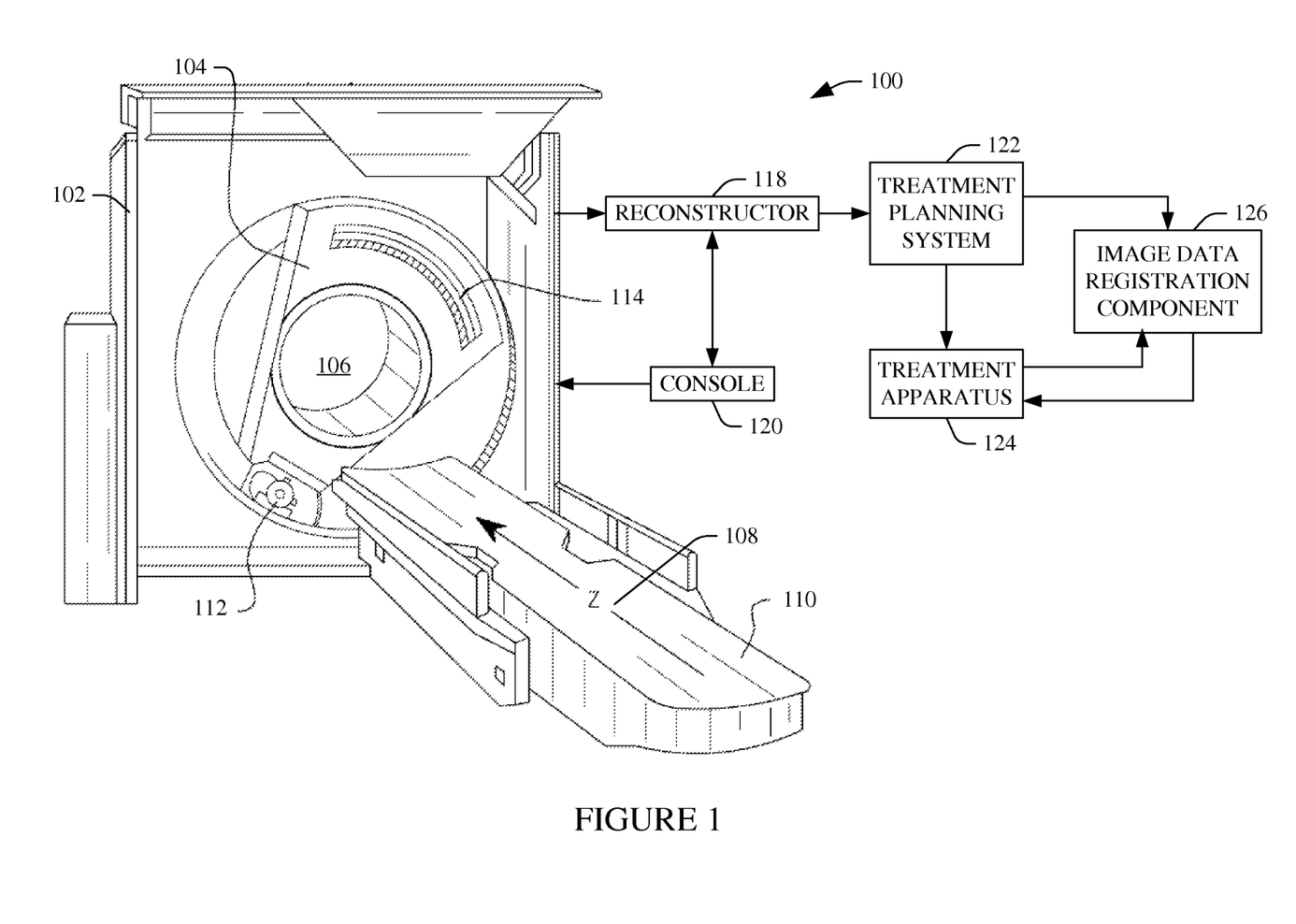
FIG. 1 schematically illustrates an imaging system in connection with a treatment planning system, a treatment apparatus and an image data registration component.

FIG. 1 schematically illustrates an imaging system such as a computed tomography (CT) scanner 100. The scanner 100 includes a stationary gantry 102 and a rotating gantry 104, which is rotatably supported by the stationary gantry 102. The rotating gantry 104 rotates around an examination region 106 about a longitudinal or z-axis 108 one or more times for one or more data acquisition cycles. A patient support 110, such as a couch, supports a patient in the examination region 106.

A radiation source 112, such as an X-ray tube, is supported by and rotates with the rotating gantry 104 around the examination region 106. The radiation source 112 emits radiation that is collimated by a source collimator to produce a generally fan, wedge, or cone shaped radiation beam that traverses the examination region 106. A radiation sensitive detector array 114 includes a one or two dimensional array of detector pixels that respectively detect radiation that traverses the examination region 106 and generate electrical signals (e.g., a current or a voltage) indicative of the detected radiation.

A reconstructor 118 reconstructs projection data and generates volumetric image data indicative of the examination region 106. A general purpose computing system serves as an operator console 120, and includes an output device such as a display and an input device such as a keyboard, mouse, and/or the like. The console 120 includes one or more processors that execute one or more computer readable instructions encoded on computer readable storage medium and/or carried by a signal, a carrier wave or the like. In one instance, the executing instructions allow a user to control operation of the system 100.

The illustrated imaging system 100 is shown in connection with a treatment planning system 122 and a treatment apparatus 124. The treatment planning system 122 can be used to simulate treatment response to treatment and/or generate treatment plans for the treatment apparatus 124 based on the image data from the imaging system 100. Additionally or alternatively, the treatment planning system 130 can use information from other imaging modalities (e.g., MRI, PET, etc.) and/or other image data for generating one or more treatment plans.

The treatment system 130 may be configured for implementing radiation therapy (external beam, brachytherapy, etc.), chemotherapy, particle (e.g., proton) therapy, high intensity focused ultrasound (HIFU), ablation, a combination thereof and/or other treatment, such as interferential therapy, transcutaneous electrical nerve stimulation, pulsed shortwave therapy, or laser therapy. The illustrated treatment system 130 includes a radiation therapy system configured for intensity-modulated radiotherapy therapy (IMRT) and/or other radiotherapy, and includes an on-board volumetric imaging, which can be used to generate in-treatment image data generated during a treatment session.

An image data registration component 126 is configured to generate a registration transformation (this may be stored either directly as a transformation, giving for each point the point to which it corresponds, or as a displacement or deformation vector field (DVF) giving for each point the vector from that point to the point to which it corresponds) that registers image data such as planning image data and subsequently acquired (e.g., in-treatment) image data. In the illustrated example, the image data registration component 126 uses the DVF to propagate contours, such as contours identifying target volumes of interest (e.g., tumors), in the planning image data to contours for the target volumes of interest in the subsequently acquired mage. Such propagation may facilitate for compensating for target volumes of interest that have changed shape (e.g., shrunk) and/or location over time.

As described in greater detail below, the image data registration component 126 employs a gray level intensity based contour guided deformable image registration in which registration of a voxel in the planning image data with a corresponding voxel in the subsequently acquired image data is guided along or across a guide direction vector such that sideways movement (which could lead to lack of smoothness and hence to geometric discontinuity in the deformed image and jaggedness in the propagated contours) of voxels is mitigated.

Figure 2:
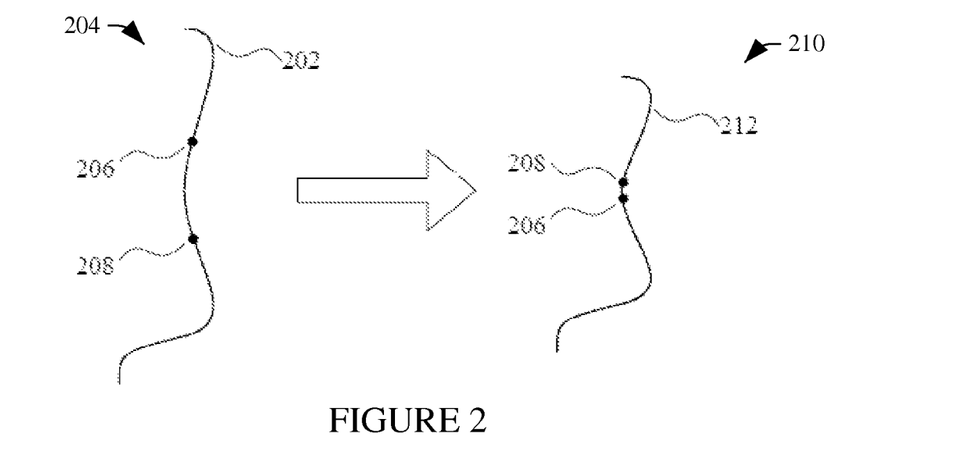
FIG. 2 illustrates a prior art approach to propagating contours between sets of image data.

FIG. 2 shows an example of such sideways movement. A contour 202 represents a contour in planning image data 204 and includes two points 206 and 208, which are deformably registered with subsequent image data 210. In this example, the two points 206 and 208 move at right angles to the contour 202 (and thus in the direction of steepest change), but these motions cross, so that after the transformation they are located on opposite sides in the propagated contour 212 in the subsequent image data 210, compared to their positions along the contour 202. As a result, some points on the contour 212 are reached by more than one point each on the contour 202. This may lead to a crumpled transformation, having geometric discontinuity and jaggedness. The contour guided deformable image registration mitigates such movement.

Returning to FIG. 1, the image data registration component 126 can be part of a computing system such as a computer, the console 120, the treatment planning system 122, and/or other system. A suitable computing system includes one or more processes that execute computer readable instructions encoded on local and/or remote computer readable storage medium. Such instructions can include all or a sub-portion of the instructions for implementing the contour propagating component 316. Additionally or alternatively, the instructions can be carried by a signal such as a carrier wave or the like.

Figure 3:
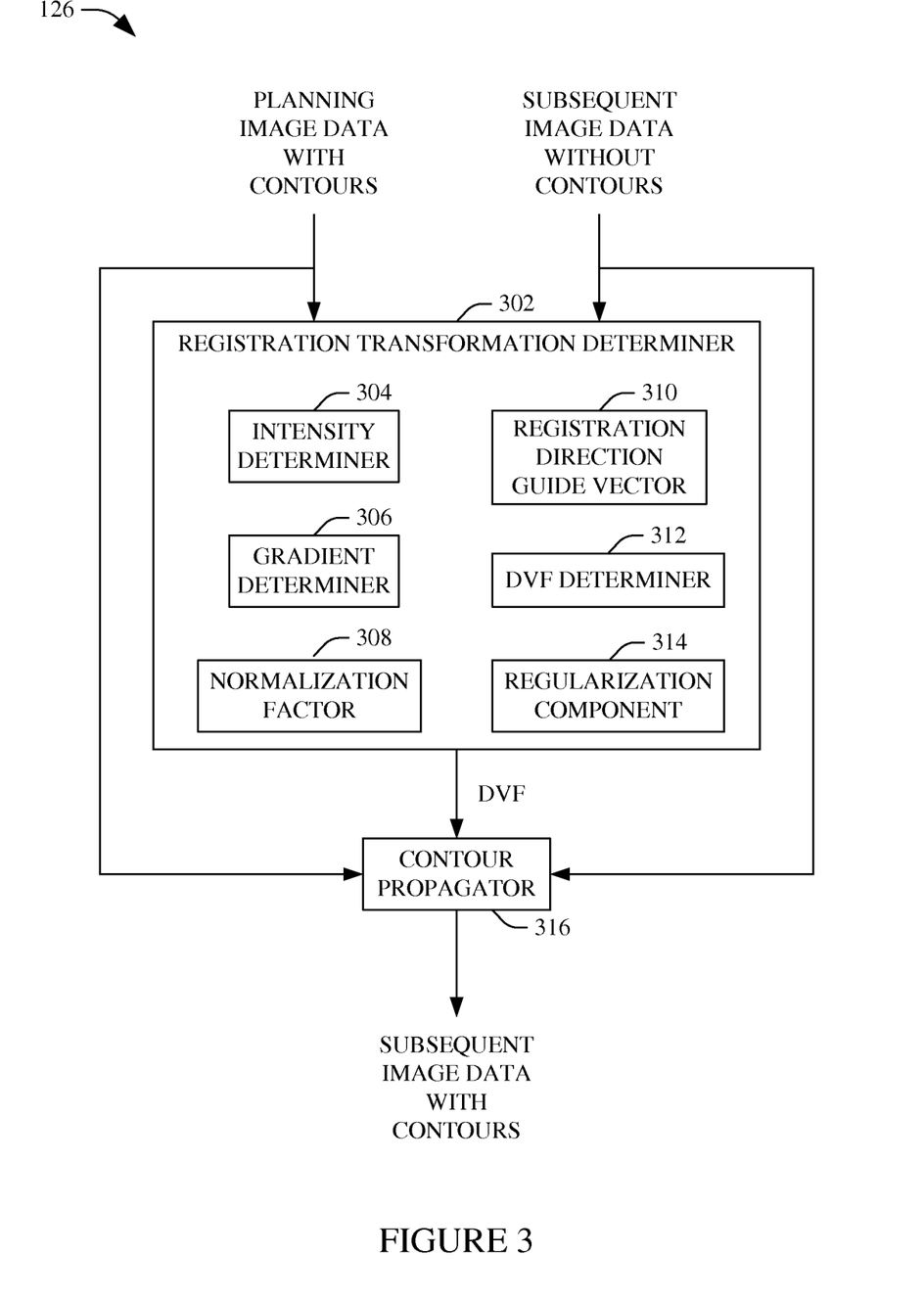
FIG. 3 schematically illustrates an example of the image data registration component.

FIG. 3 illustrates schematically illustrates an example of the image data registration component 126.

The illustrated contour propagating component 316 includes a registration transformation determiner 302, which receives planning image data with contours and subsequently acquired image data without contours.

An intensity determiner 304 determines the gray level intensity of each voxel in each of the reference and subsequent image data. In the illustrated embodiment, each voxel value corresponds to a gray level intensity values indicative of the radiodensity of the anatomical tissue represented thereby.

A gradient determiner 306 determines the gray level intensity gradient of each voxel in three dimensions (x, y and z) in the subsequent image data. Generally, the gradient indicates the directional change in the intensity in the immediate neighborhood of a voxel and can be determined by convolving the image data with a filter, such as the Sobel filter or other filter, and/or through other known and/or other approaches. Gradient vectors substantially larger than the average size for the image generally correspond to boundaries, such as surfaces of anatomical structure in the image data.

A normalization factor 308 facilitates preventing overshoot. In the illustrated embodiment, the normalization factor 308 is a default value, pre-determined empirically, theoretically, or otherwise, and can be modified.

Figure 4:
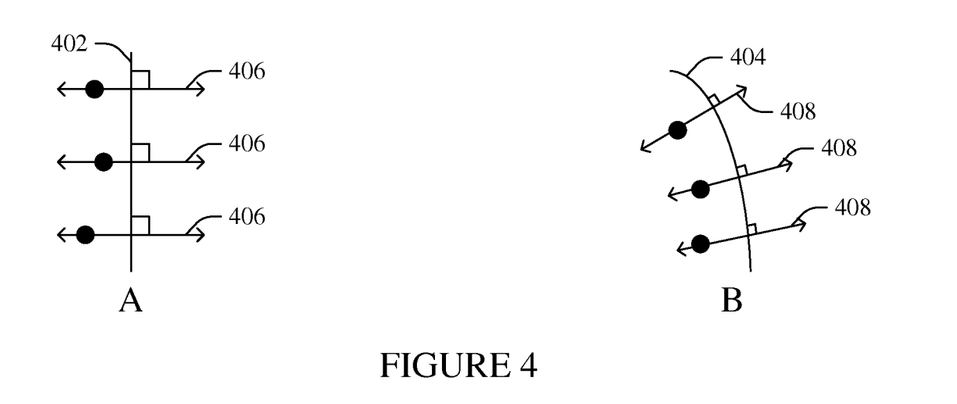
FIG. 4 illustrates an example approach in which contours are propagated between sets of image data across a registration direction guideline.

A registration direction guide vector 310 defines a (straight or curved) line across or along which the registration is performed. A suitable registration direction guide vector 310 includes a contour for a target volume of interest in the planning image data and/or a clinician provided guide line. In either case, the clinician may interact with an interactive graphical user interface (GUI) to identify and/or draw the line, modify, delete, etc. the line. Examples of suitable guide lines are described in further detail with respect to FIGS. 4 and 5.

By way of example, a processor can present a GUI, which includes one or more images and various contouring tools. A user can use the tools to identify and/or draw the line, modify, delete, etc. the line. In response, the GUI receives an input indicative of the user defined contour, modification, deletion, etc. The resulting contour can then be used for the contour guided deformation registration. The GUI, in addition to allowing a user to create, modify and/or delete contours, allow the user to activate utilization of contours.

Figure 5:
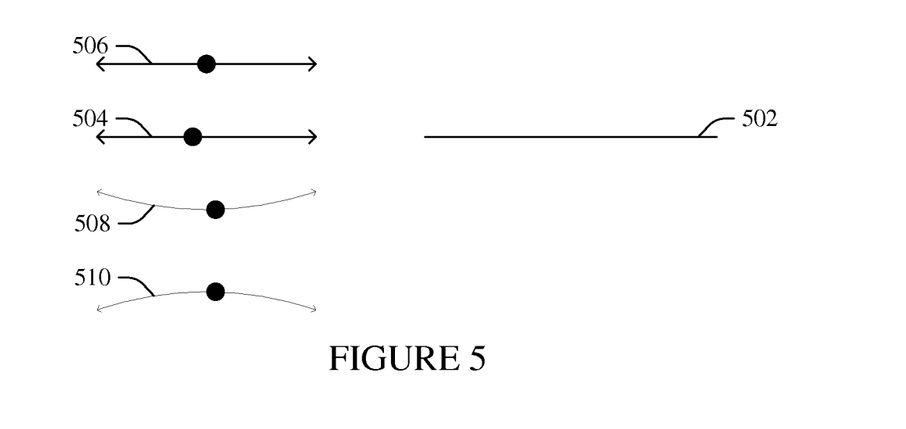
FIG. 5 illustrates an example approach in which contours are propagated between sets of image data along a registration direction guideline.

In FIGS. 4A and 4B, the registration direction guide vector 310 respectively includes reference guide lines 402 and 404 across which the registration is respectively performed along lines 406 and 408 perpendicular to the lines 402 and 404. In FIG. 5, the registration direction guide vector 310 provides a reference line 502 along which the registration is performed, including along a line 504 overlapping the reference line 502, a line 506 running parallel to the reference line 502, a line 508 being pulled towards but never reaching the reference line 502, and/or a line 510 being pushed away from the reference line 502 but never reaching an adjacent guide line. Instead of moving purely along the (estimated) direction of maximum slope in the gray levels, a point moves in a direction which is a compromise between that direction and the direction of the reference line 502. The closer the point is to the reference line 502, the more strongly the compromise is biased in favor of the direction of the reference line 502, and against the gradient direction.

Note that with such an approach points in the planning image data will map to different non-sideways overlapping points in the subsequently acquired image data, maintaining their orientation with respect to each other. This is in contrast to a non-contour guided direction approach such as the approach shown in FIG. 2 in which the points 206 and 208 in the planning image data 202 were mapped sideways about the same point 212 in the subsequent image data 210. As such, the registration direction guide vector 310 facilitates mitigating crumpling a contour when propagating the contour from planning image data to subsequently acquired image data.

Returning to FIG. 3, a DVF determiner 312 determines a DVF based on at least one or more of the intensities determined by the intensity determiner 304, the gradient determined by the gradient determiner 306, the normalization factor 308 and the guide direction vector 310. By way of non-limiting example, in one instance, the DVF determiner 312 determines a DVF ($\vec{d}(x)$) based on EQUATION 1:

$$\vec{d}(x) = \frac{[I_s(x) - I_p(x)]\vec{\nabla} I_s(x)}{\|\vec{\nabla} I_s(x)\|^2 + [I_s(x) - I_p(x)]^2 / K} + \frac{[I_s(x) - I_p(x)][\vec{\nabla} I_s(x) \cdot \vec{n}]}{\|\vec{\nabla} I_s(x)\|^2 + [I_s(x) - I_p(x)]^2 / K} \vec{n}$$

EQUATION 1 wherein $I_p(x)$ represents the intensity value of the voxels of the planning image data, $I_s(x)$ represents the intensity value of the voxels of the subsequently acquired image data, $I_s(x) - I_p(x)$ represents the difference in intensity value, $\vec{\nabla} I_s(x)$ represents the intensity gradient, $\|\vec{\nabla} I_s(x)\|^2$ represents the size of the gradient, K represents the normalization factor, and $\vec{n}$ represents the guide direction vector 310.

In EQUATION 1, a first term $$\frac{[I_s(x) - I_p(x)]\vec{\nabla} I_s(x)}{\|\vec{\nabla} I_s(x)\|^2 + [I_s(x) - I_p(x)]^2 / K}$$

climbs the gradient of image intensity either upward or downward without regard to any particular direction. However, in EQUATION 1, a second term $$\frac{[I_s(x) - I_p(x)][\vec{\nabla} I_s(x) \cdot \vec{n}]}{\|\vec{\nabla} I_s(x)\|^2 + [I_s(x) - I_p(x)]^2 / K} \vec{n}$$

climbs the gradient, but is constrained to move only along the direction ($\vec{n}$) indicated by the guide direction vector 310.

A regularization component 314 regularizes the DVF. In this illustrated embodiment, the regularization component 314 regularizes the DVF by applying Gaussian filtering. However, other known and other regularization approaches are also contemplated herein.

The illustrated contour propagating component 316 further includes a contour propagator 316, which propagates the contours in the planning image to the subsequently acquired image data, such that the contours continue to identify the target volumes of interest.

In the above non-limiting example, the registration transformation determiner 302 determines a DVF which is used to propagate contours of target volumes and/or anatomical structures of interest from planning to subsequently acquired image data in connection with radiation therapy. However, it is to be understood that the registration transformation determiner 302, additionally or alternatively, can be used to determine DVFs for other applications, including non-radiation therapy application, and in particular any therapy which follows a plan directing material or energy to specific regions of tissue. In general, the registration transformation determiner 302 can be used in connection with any application in which images are registered.

Figure 6:
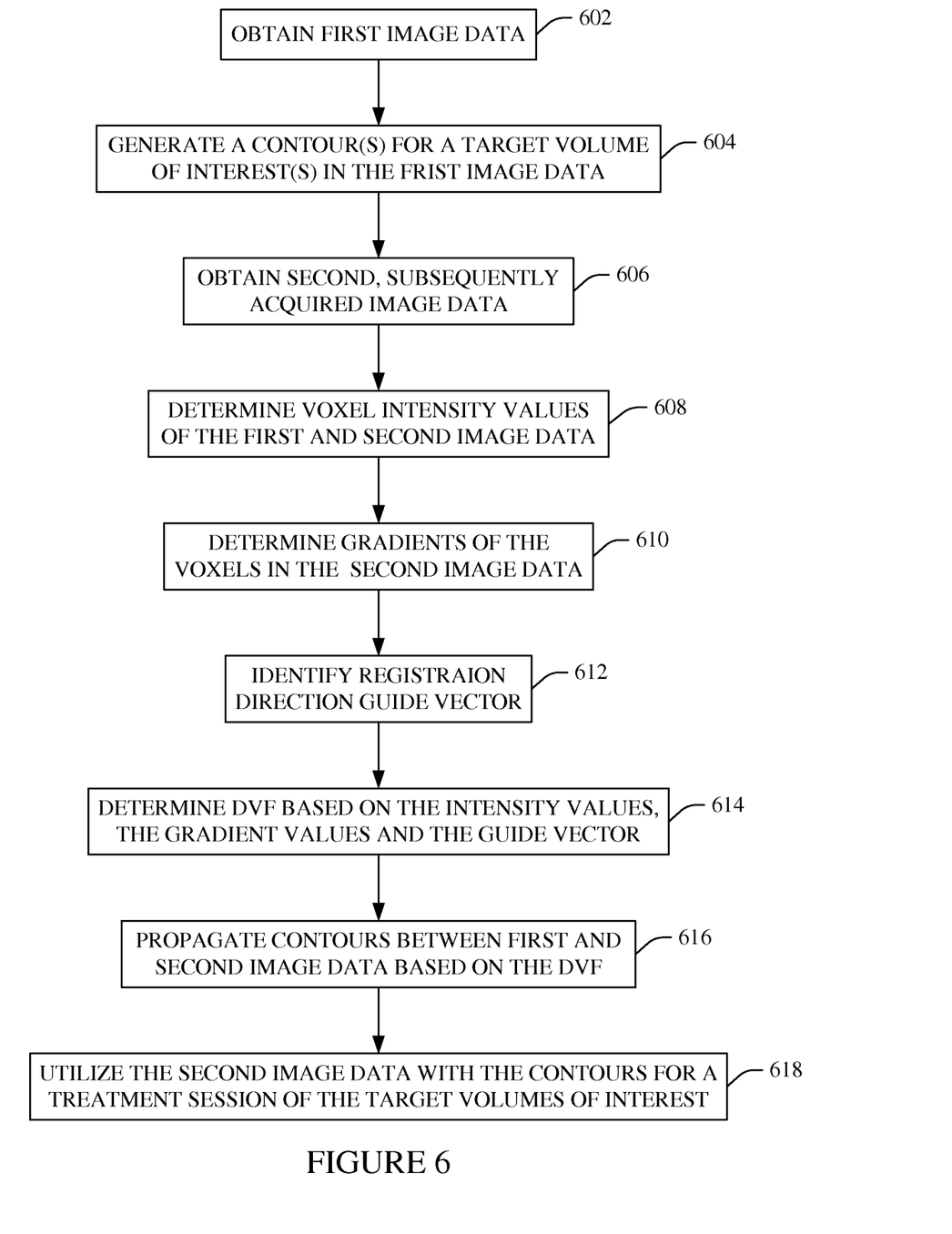
FIG. 6 illustrates an example method for determining a deformation field vector.

FIG. 6 illustrates an example method for determining a DVF, and is described in connection with a non-limiting example in which a contour of a target volume of interest in radiation therapy planning image data is propagated to subsequently acquired image data.

It is to be appreciated that the ordering of the acts in the methods described herein is not limiting. As such, other orderings are contemplated herein. In addition, one or more acts may be omitted and/or one or more additional acts may be included.

At 602, first image data for a patient is obtained. The may include scanning the patient and/or obtaining image data from a previous scan of the patient.

At 604, generate at least one contour for at least one target volume of interest in the image data.

At 606, second image data for the patient, acquired subsequent to the first image data, is obtained. The subsequently acquired image data may correspond to image data acquired during a treatment session, image data acquired a predetermined time after the treatment session, image data acquired a predetermined time after the creation of the planning image data, etc.

At 608, voxels intensity (gray level) values of the voxels of the first and second image data are determined.

At 610, voxel intensity gradients are determined for the voxels in the second image data.

At 612, a registration direction guide vector (e.g., the guide 310) is identified. As described herein, the guide can be a contour of a target volume of interest in the planning image data and/or a clinician drawn guide line, which guides the registration either perpendicular to the guide line or parallel to the guide line.

At 614, a deformation field vector (DVF) that registers the first and second image data, based at least on the voxels intensities, the image gradient, and the registration direction guide vector is determined.

At 616, the DVF is used to propagate contours for target volumes and/or anatomical structures of interest in the first image data to contours for the target volumes of interest in the second image data. As described herein, such contours may identify tumors to be treated.

At 618, a treatment session is performed based on the second image data, utilizing the contours propagated thereto.

The above may be implemented by way of computer readable instructions, which when executed by a computer processor(s), cause the processor(s) to carry out the described acts. In such a case, the instructions are stored in a computer readable storage medium associated with or otherwise accessible to the relevant computer.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method, comprising:
    obtaining first volumetric image data, which is acquired at a first time, including a region of interest of a subject, wherein at least one structural feature in the region of interest is located at a first position in the first volumetric image data;
    creating a contour for the at least one structural feature on the first volumetric image data, wherein the contour identifies the at least one structural feature;
    obtaining second volumetric image data, which is acquired at a second time, including the region of interest of the subject, wherein the at least one structural feature in the region of interest is located at a second position in the second volumetric image data,
    wherein the second time is subsequent to the first time, and the first and second positions are different positions;
    adding a direction guideline to the first volumetric image data adjacent to the contour;
    determining a registration transformation that registers the first and second volumetric image data such that the at least one structural feature in the first volumetric image data aligns with the at least one structural feature in the second volumetric image data, wherein the registration transformation propagates the contour from the first volumetric image data to the second volumetric image data based on a combination of an estimated direction of a maximum slope of the contour in gray levels and the direction guideline; and
    generating a signal indicative of the registration transformation.

2. The method of claim 1, wherein determining the registration transformation includes determining a deformation field vector that extends along the direction guideline.

3. The method of claim 1, wherein determining the registration transformation includes determining a deformation field vector that extends along a line parallel to the direction guideline.

4. The method of claim 3, wherein the deformation field vector is pulled towards the direction guideline.

5. The method of claim 1, wherein determining the registration transformation includes determining a deformation field vector that extends perpendicularly from the direction guideline.

6. The method of claim 2, wherein the direction guideline is a curved line.

7. The method of claim 2, wherein direction guideline line is a straight line.

8. The method of claim 2, wherein the direction guideline is a user drawn line superimposed over the first image data.

9. The method of claim 1, wherein the combination weights the direction guideline for propagating a point on the contour to the second volumetric image data as a function of a distance between the point and the direction guideline.

10. The method of claim 9, further comprising: applying a first weight to propagate a first point on the contour based on a first distance between the point and the direction guideline, and applying a second weight to propagate a second point on the contour based on a second distance between the point and the direction guideline, wherein the first distance is less than the second distance, and the first weight is greater than the second weight.

11. The method of claim 2, wherein the first and second volumetric image data include voxels represents gray level intensity values, and determining the registration transformation, comprising:
    determining a difference in intensity value between corresponding voxels in the first and second volumetric image data;
    determining an intensity gradient vector for the voxel in the second volumetric image data;
    determining a normal vector that is perpendicular to the direction guideline;
    determining a dot product of the intensity gradient vector and the normal vector;
    determining a square of a magnitude of the intensity gradient vector;
    determining a square of the difference; and
    calculating a deformation field vector as the product of the difference, the dot product and the normal vector divided by a product of the square of the magnitude and the square of the difference, wherein the deformation field vector is the registration transformation.

12. The method claim 11, further comprising:
regularizing the deformation field vector; and
normalizing the square of the difference a normalization factor prior to calculating the deformation field vector and using the normalized square of the difference to calculate the deformation field vector.

13. The method of claim 1, further comprising:
presenting an interactive graphical user interface which includes contouring tools, wherein the interactive graphical user interface receives an input indicative of a user defined direction guideline, wherein the user-defined direction guideline is the generated direction guideline.

14. A system, comprising:
a processor that determines a registration transformation that registers two images, wherein the registration transformation is determined based at least on voxel intensity values of the two images, voxel intensity gradient values for one of the two images, and guide vector values that indicate a direction of the registration and that correspond to a line placed that is separate from the images and that is placed next to a contour of a structure of interest in one of the two images, and wherein the registration transformation propagates the contour to a second of the two images based on a combination of an estimated direction of a maximum slope of the contour in gray levels and the line.

15. The system of claim 14, wherein the guide vector values define on the line across which the registration is performed.

16. The system of claim 14, wherein the guide vector values define on the line along which the registration is performed.

17. The system of claim 14, wherein the line is separate and distinct from the contour.

18. A method, comprising:
determining a deformation field vector which registers two images based on a contour guided deformable image registration; and
registering the two images using the deformation field vector, wherein the registering propagates a contour of a structure of interest in a first image of the two images to a second image of the two images using a weighted registration which applies a first weight to an estimated direction of a maximum slope of the contour in gray levels and applies a second weight to a direction guideline placed adjacent to the contour.

19. The method of claim 18, wherein the first image is acquired at a first time and includes the structure of interest at a first location and the contour, which identifies the structure of interest, and the second image is acquired at a second different time and includes the structure of interest at a second different location.

20. The method of claim 19, wherein the contour is created by a user via a graphical user interface.

21. The method of claim 18, wherein the first image is a treatment planning image and the second image is a follow-up image.

22. The method of claim 21, wherein the second image is acquired during a treatment procedure.

23. The method of claim 22, wherein the treatment procedure includes at least one of radiation therapy, chemotherapy, particle therapy, high intensity focused ultrasound, ablation, interferential therapy, transcutaneous electrical nerve stimulation, pulsed shortwave therapy, laser therapy, or a combination thereof.

24. The method of claim 18, wherein the direction guideline is superimposed over the first image and extends along or across the direction guideline.

25. The method of claim 18, wherein the direction guideline is a user drawn line superimposed over the first image.

* * * * *